(12) United States Patent
Takahashi

(10) Patent No.: US 11,094,157 B2
(45) Date of Patent: Aug. 17, 2021

(54) CARD READER

(71) Applicant: NIDEC SANKYO CORPORATION, Nagano (JP)

(72) Inventor: Kazunori Takahashi, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 203 days.

(21) Appl. No.: 16/414,760

(22) Filed: May 16, 2019

(65) Prior Publication Data
US 2019/0354730 A1 Nov. 21, 2019

(30) Foreign Application Priority Data
May 18, 2018 (JP) .............................. JP2018-095935

(51) Int. Cl.
G07F 7/08 (2006.01)
G06K 7/00 (2006.01)
G07F 19/00 (2006.01)
G06K 13/08 (2006.01)
G06K 13/00 (2006.01)

(52) U.S. Cl.
CPC ........... *G07F 7/0873* (2013.01); *G06K 7/003* (2013.01); *G06K 7/0078* (2013.01); *G06K 13/0868* (2013.01); *G06K 13/0875* (2013.01); *G07F 19/2055* (2013.01); *G06K 13/00* (2013.01); *G06K 13/08* (2013.01); *G06K 13/085* (2013.01); *G06K 13/0862* (2013.01)

(58) Field of Classification Search
CPC .... G06K 13/00; G06K 13/08; G06K 13/0806; G06K 13/085; G06K 13/0862; G06K 13/0868; G06K 13/0875; G06K 7/00; G06K 7/0004; G06K 7/081; G06K 7/082; G07F 7/0873
See application file for complete search history.

(56) References Cited

U.S. PATENT DOCUMENTS 5,949,048 A * 9/1999 Nakamura ............. G06K 13/08
235/439
6,042,010 A * 3/2000 Kanayama ............. G06K 7/084
235/379

(Continued)

FOREIGN PATENT DOCUMENTS

JP 2016192053 11/2016
JP 2017219971 12/2017

*Primary Examiner* — Thien M Le
*Assistant Examiner* — April A Taylor
(74) *Attorney, Agent, or Firm* — JCIPRNET

(57) ABSTRACT

In a card reader (1), if a shutter member (10), being located at a block position for blocking a card transfer path (3), rotates toward a deep side of the card reader, the shutter member moves to an open position. In a part within a surface of a side of the card transfer path in a thickness direction of the card (2), at a side deeper than the shutter member, there are formed only an open part (31) and an open part (32); the open part being for preventing an interference of the shutter member, rotating toward the open position, with the main body frame (4), as well as ejecting a foreign object out of the card transfer path; the open part being for preventing an interference of a movable component (21), placed so as to face the card transfer path, with the main body frame.

18 Claims, 6 Drawing Sheets

(56) References Cited

U.S. PATENT DOCUMENTS

| | | | |
|---|---|---|---|
| 6,527,187 B1 * | 3/2003 | Nagata | G06K 7/084 |
| | | | 235/380 |
| 10,528,771 B2 * | 1/2020 | Negishi | G06K 13/085 |
| 2004/0262389 A1 * | 12/2004 | Nagata | G06K 13/08 |
| | | | 235/441 |
| 2017/0351880 A1 * | 12/2017 | Ozawa | G06K 7/081 |

* cited by examiner

CARD READER

CROSS-REFERENCE TO RELATED APPLICATION

This application claims the priority benefit of Japan application serial no. 2018-095935, filed on May 18, 2018. The entirety of the above-mentioned patent application is hereby incorporated by reference herein and made a part of this specification.

FIELD OF THE INVENTION

The present invention relates to a card reader that executes reading data recorded in a card and recording data into a card.

BACKGROUND

Conventionally, known is a manual card reader with which reading data recorded in a card and recording data into a card are carried out (for example, refer to Patent Document 1). A card reader described in Patent Document 1 is a card reader of a so-called dip type. In the card reader, there is formed a card transfer path through which a card moves. Meanwhile, the card reader includes a frame with which the card transfer path is formed, an IC contact block having a plurality of IC contact springs, and a magnetic head.

In the card reader described in Patent Document 1, there is shaped a cutout part that is cut out so as to enable a user to insert and extract a card, at a front end side part of the frame. The cutout part is cut out from a front end toward a back side in the frame, and a protruding part is formed at both sides of the cutout part. The magnetic head is fixed to one of two protruding parts. The IC contact block is fixed to the frame at a side located deeper than the cutout part. Meanwhile, the IC contact block is placed in such a way as to face the card transfer path, from one side of the card transfer path, in a thickness direction of a card that moves through the card transfer path.

In the card reader described in Patent Document 1, there is shaped an open part in order to prevent the IC contact block and the frame from interfering with each other, in a surface at one side of the card transfer path in a card thickness direction. In the meantime, there is shaped a comparatively large open part at a position, located deeper than the cutout part, in a surface at the other side of the card transfer path in the card thickness direction. In the case of the card reader described in Patent Document 1, by making use of the comparatively large open part shaped in the surface at the other side of the card transfer path in the card thickness direction, it is possible to eject a foreign object, having entered the card transfer path through a card insertion slot, out of the card transfer path.

Furthermore, conventionally known is a card reader of a card transfer type, with which reading data recorded in a card and recording data into a card are carried out (for example, refer to Patent Document 2). In the card reader described in Patent Document 2, there is formed a card transfer path through which a card is transferred. The card reader includes a shutter member that is movable between a position for blocking the card transfer path and a position for opening the card transfer path, an IC contact block having a plurality of IC contact springs, and a magnetic head.

Moreover, the card reader described in Patent Document 2 is provided with a capacitance sensor for detecting a foreign object having been installed in the card transfer path. The capacitance sensor is placed at a side deeper than the shutter member, in the card reader. In the case of the card reader described in Patent Document 2, it is possible to detect a skimming device having been installed inside the card reader by use of the capacitance sensor; the skimming device being for a criminal to illegally read data recorded in a card.

PRIOR ART DOCUMENTS

Patent Documents

Patent Document 1: Japanese Unexamined Patent Application Publication No. 2016-192053
Patent Document 2: Japanese Unexamined Patent Application Publication No. 2017-219971

SUMMARY

In the case of the card reader described in Patent Document 1, there is a risk that a skimming device is installed inside the card reader, by making use of the comparatively large open part shaped in the surface at the other side of the card transfer path in the card thickness direction. For preventing the skimming device from being installed inside the card reader described in Patent Document 1, in order to protect data from illegally reading by use of the skimming device; what is needed is to block the open part shaped in the surface at the other side of the card transfer path. Unfortunately, if the open part is blocked, it becomes difficult to eject a foreign object, such as a particle dust and the like, out of the card transfer path. Moreover, if such a particle dust in the card transfer path is not ejected so as to remain in the card transfer path, there appears a risk that a move of the card is disturbed so that the card reader cannot be used.

Then, it is an objective of the present invention to provide a card reader with which a foreign object, such as a particle dust and the like, can be ejected out of a card transfer path, and in the meantime, it easily becomes possible to prevent a skimming device from being installed inside the card reader; and even in a case where a skimming device is installed inside the card reader, it still becomes possible to protect data from illegally reading by use of the skimming device.

In order to bring a solution for the subject described above; a card reader according to the present invention is a card reader for carrying out at least one of reading data recorded in a card and recording data into the card; the card reader comprises: a main body frame in which a card transfer path for moving the card is formed; a shutter member that can rotate between a block position for blocking the card transfer path, and an open position for opening the card transfer path; and a movable component that is placed at a position of a side deeper than the shutter member in the card reader, and placed so as to face the card transfer path, in order to carry out predetermined operation; wherein, the shutter member is rotatable with respect to a rotating axis in a widthwise direction of the card, the widthwise direction being perpendicular to both a moving direction of the card moving through the card transfer path, and a thickness direction of the card moving through the card transfer path; if the shutter member, being located at the block position, rotates toward a deep side, the shutter member moves to the open position; and in a part within a surface of a side of the card transfer path in the thickness direction of the card, at a side deeper than the shutter member, there are formed only a first open part and a second open part, and no other open part except the first open part and the second open part is formed; the first open part being for preventing an interference of the shutter member, rotating toward the open position, with the main body frame, as well as ejecting a foreign object out of the card transfer path; the second open part being for preventing an interference of the movable component with the main body frame.

According to the present invention, it is preferable that the card reader comprises; an IC contact block including a plurality of IC contact springs that contacts an external connection terminal of an IC chip, which is formed on a surface of one side of the card, and a supporting member that contacts a surface of the other side of the card, and supports the card, in order to make the external connection terminal and the IC contact springs contact each other with a predetermined contact pressure, the IC contact block and the supporting member being as the movable component; the second open part, for preventing an interference of the supporting member with the main body frame, is formed in a surface of one side of the card transfer path in the thickness direction of the card; and the second open part, for preventing an interference of the IC contact block with the main body frame, is formed in a surface of the other side of the card transfer path in the thickness direction of the card.

In order to bring a solution for the subject described above; a card reader according to the present invention is a card reader for carrying out at least one of reading data recorded in a card and recording data into the card, the card reader comprising: a main body frame in which a card transfer path for moving the card is formed; and a shutter member that can rotate between a block position for blocking the card transfer path, and an open position for opening the card transfer path; wherein, the shutter member is rotatable with respect to a rotating axis in a widthwise direction of the card, the widthwise direction being perpendicular to both a moving direction of the card moving through the card transfer path, and a thickness direction of the card moving through the card transfer path; if the shutter member, being located at the block position, rotates toward a deep side of the card reader, the shutter member moves to the open position; and in a part within a surface of a side of the card transfer path in the thickness direction of the card, at a side deeper than the shutter member, there is formed only a first open part, and no other open part except the first open part is formed; the first open part being for preventing an interference of the shutter member, rotating toward the open position, with the main body frame, as well as ejecting a foreign object out of the card transfer path.

In the card reader according to the present invention; in the part within the surface of a side of the card transfer path in the thickness direction of the card, at the side deeper than the shutter member, there is formed the first open part that is for preventing an interference of the shutter member, rotating toward the open position, with the main body frame, as well as ejecting a foreign object out of the card transfer path. Therefore, according to the present invention, it becomes possible to eject a foreign object, such as a particle dust and the like, out of the card transfer path by making use of the first open part.

Furthermore, according to the present invention; in the part within the surface of a side of the card transfer path in the thickness direction of the card, at the side deeper than the shutter member, there are formed only the second open part and the first open part, and no other open part except the first open part and the second open part is formed; the second open part being for preventing an interference of the movable component with the main body frame. Alternatively, according to the present invention; in the part within the surface of a side of the card transfer path in the thickness direction of the card, at the side deeper than the shutter member, there is formed only the first open part, and no other open part except the first open part is formed. Therefore, according to the present invention, it easily becomes possible to prevent a skimming device from being installed inside the card reader;

Moreover, according to the present invention; the first open part, for ejecting a foreign object out of the card transfer path, also plays a role in prevention of an interference of the shutter member, rotating toward the open position, with the main body frame; and therefore, in a case where a skimming device is installed in the first open part, the shutter member, rotating toward the open position, interferes with the skimming device so that the shutter member does not rotate to the open position. Therefore, according to the present invention; in case of a skimming device having been installed in the first open part, if a card is inserted into the card reader, the shutter member does not rotate from the block position to the open position so that it becomes impossible to accept the card into the card reader. As a result of that, in the present invention, even in a case where a skimming device is installed inside the card reader, it still becomes possible to protect data from illegally reading by use of the skimming device.

Thus, according to the present invention; a foreign object, such as a particle dust and the like, can be ejected out of a card transfer path, and in the meantime, it easily becomes possible to prevent a skimming device from being installed inside the card reader; and even in a case where a skimming device is installed inside the card reader, it still becomes possible to protect data from illegally reading by use of the skimming device. Furthermore, in the present invention, the first open part for prevention of an interference of the shutter member, rotating toward the open position, with the main body frame, also plays a role in ejecting a foreign object out of the card transfer path; and the first open part is formed immediately next to the shutter member at a deep side. Therefore, according to the present invention, a particle dust having entered through the card insertion slot can be ejected out of the card transfer path, at the deep side immediately next to the shutter member.

According to the present invention, it is preferable that the main body frame comprises; a shutter member holding part that holds the shutter member in such a way as to be rotatable, and a guiding part that makes up a part of a surface of one side of the card transfer path in the thickness direction of the card, and that is placed at a side deeper than the shutter member; and the first open part is formed between the shutter member holding part and the guiding part.

According to the present invention, it is preferable that, at a front end part of the guiding part, there is shaped a slope surface which is sloped in such a way that; the more frontward a position is located, the further the position is departed from the card transfer path. According to this configuration, it becomes possible to prevent an end part of the card, moving toward a deep side of the first open part, from being caught at the front end part of the guiding part.

According to the present invention, it is preferable that the main body frame comprises a second guiding part that makes up the surface of the other side of the card transfer path, in the thickness direction of the card, and both side surfaces of the card transfer path, in the widthwise direction of the card; and the guiding part is formed as a component being separate from the second guiding part, and fixed to the second guiding part. According to this configuration; for example, in the case of the card reader, in which the guiding part is not mounted, being already installed in a market, it becomes possible to additionally mount the guiding part in the card reader.

According to the present invention, it is preferable that the card reader is provided with a capacitance sensor to be placed at a side deeper than the shutter member; the guiding part is formed of resin; and the capacitance sensor is fixed to the guiding part. According to this configuration; if a skimming device is installed inside the card reader by any chance, it becomes possible by use of the capacitance sensor to detect the skimming device having been installed.

According to the present invention; it is preferable that, provided that a part of the shutter member located at the open position; the part being placed inside the first open part; is represented as an open-part placement portion, a maximum width of the first open part in the moving direction of the card is 1.3 through 2 times as large as a width of the open-part placement portion in the moving direction of the card. In the opinion based on an examination by the inventor of the present invention; according to this configuration, it easily becomes possible to effectively prevent an installation of a skimming device to the first open part, and it easily becomes possible to eject a foreign object, such as a particle dust and the like, out of the card transfer path, by making use of the first open part.

According to the present invention; it is preferable that, in a part within a side surface of the card transfer path in the widthwise direction of the card, at a side deeper than the shutter member, there is shaped a third open part for ejecting a foreign object out of the card transfer path. According to this configuration; in the case where the card reader is installed in such a way that the widthwise direction of the card becomes consistent with a perpendicular direction, it becomes possible to eject a foreign object, such as a particle dust and the like, out of the card transfer path, by making use of the third open part. Incidentally, a width in a card thickness direction of the third open part, shaped in the side surface of the card transfer path, in the widthwise direction of the card, is narrow so that it is difficult to install a skimming device inside the card reader, by making use of the third open part.

As described above, with respect to the card reader according to the present invention; a foreign object, such as a particle dust and the like, can be ejected out of a card transfer path; and in the meantime, it easily becomes possible to prevent a skimming device from being installed inside the card reader; and even in a case where a skimming device is installed inside the card reader, it still becomes possible to protect data from illegally reading by use of the skimming device.

DESCRIPTION OF THE EMBODIMENTS

An embodiment of the present invention is described below with reference to the accompanying drawings.
(General Configuration of Card Reader)

Figure 1:
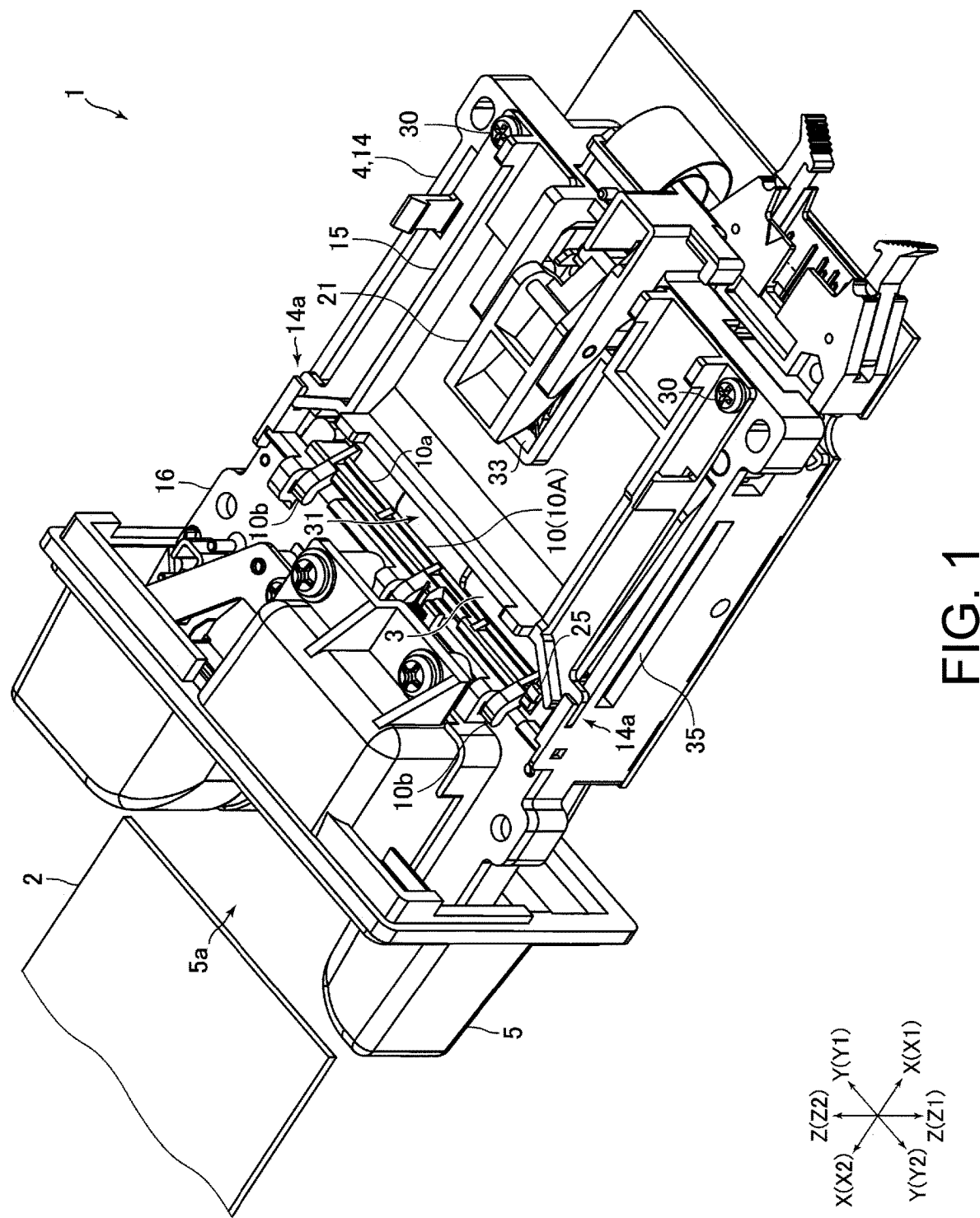
FIG. 1 is a perspective view of a card reader according to an embodiment of the present invention.
Figure 2:
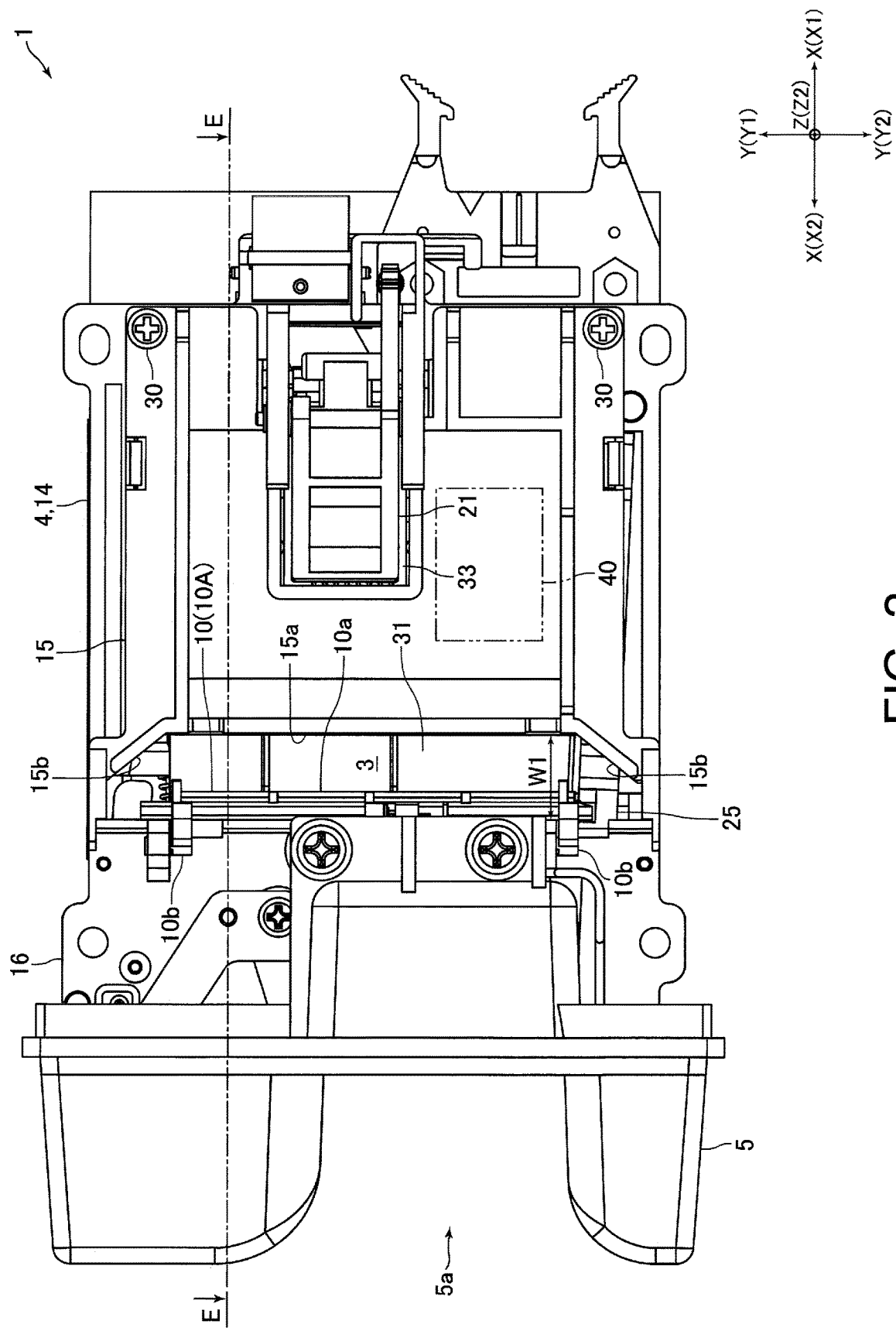
FIG. 2 is a bottom plan view of the card reader shown in FIG. 1.
Figure 3:
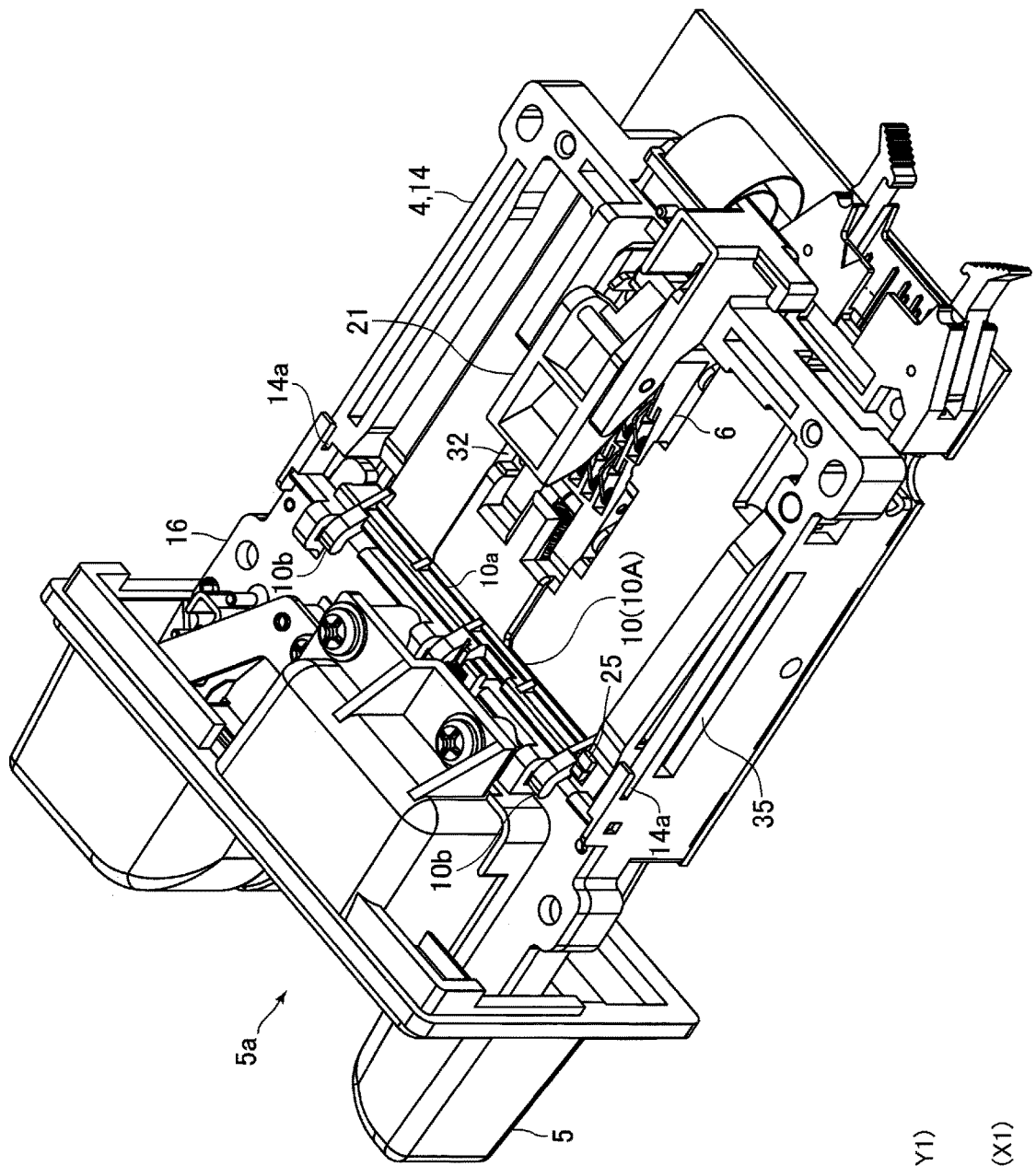
FIG. 3 is a perspective view showing a state in which a guiding part is removed from the card reader shown in FIG. 1.
Figure 4:
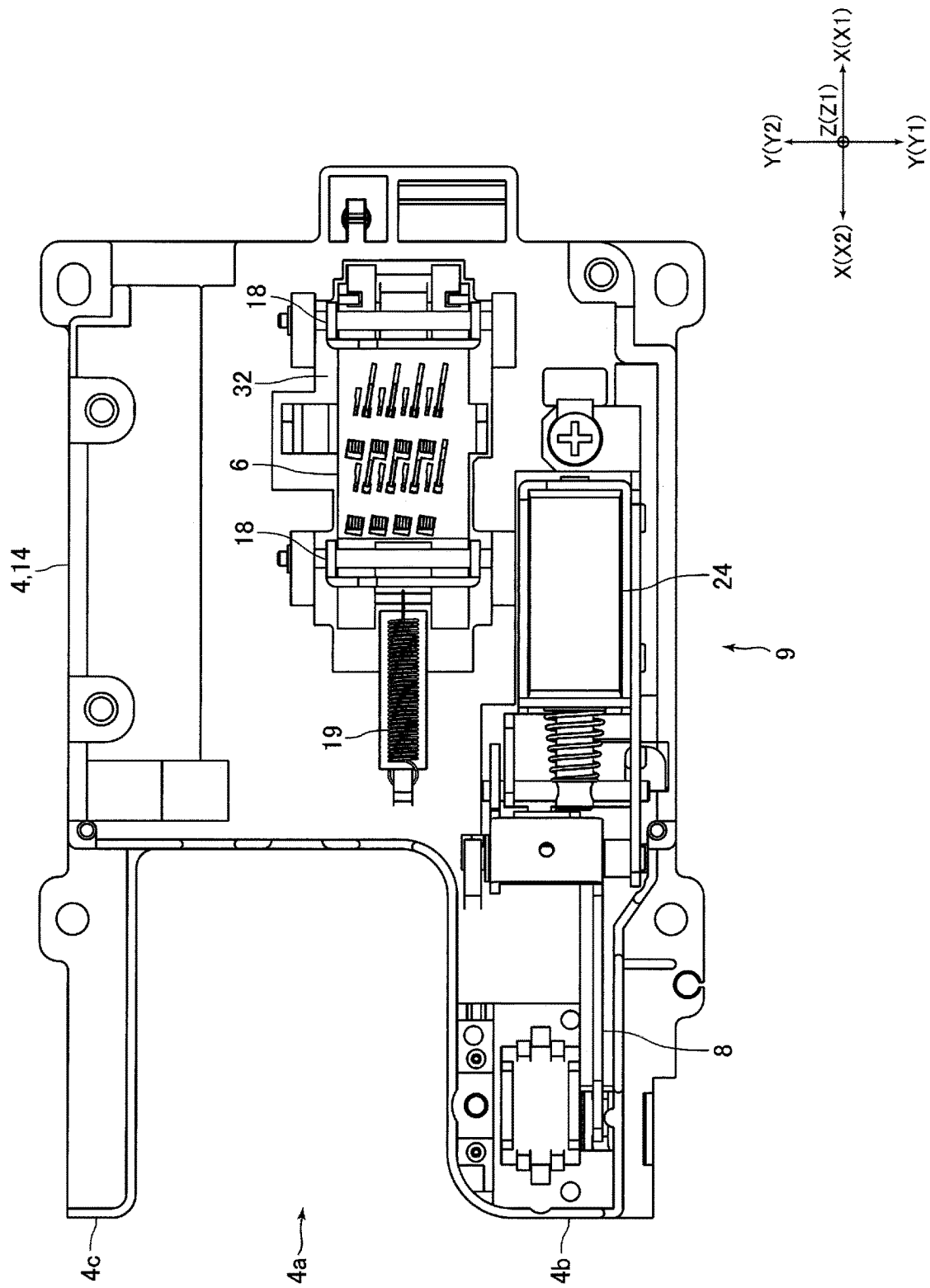
FIG. 4 is a plan view showing a state in which a bezel and the like are removed from the card reader shown in FIG. 1.
Figure 5:
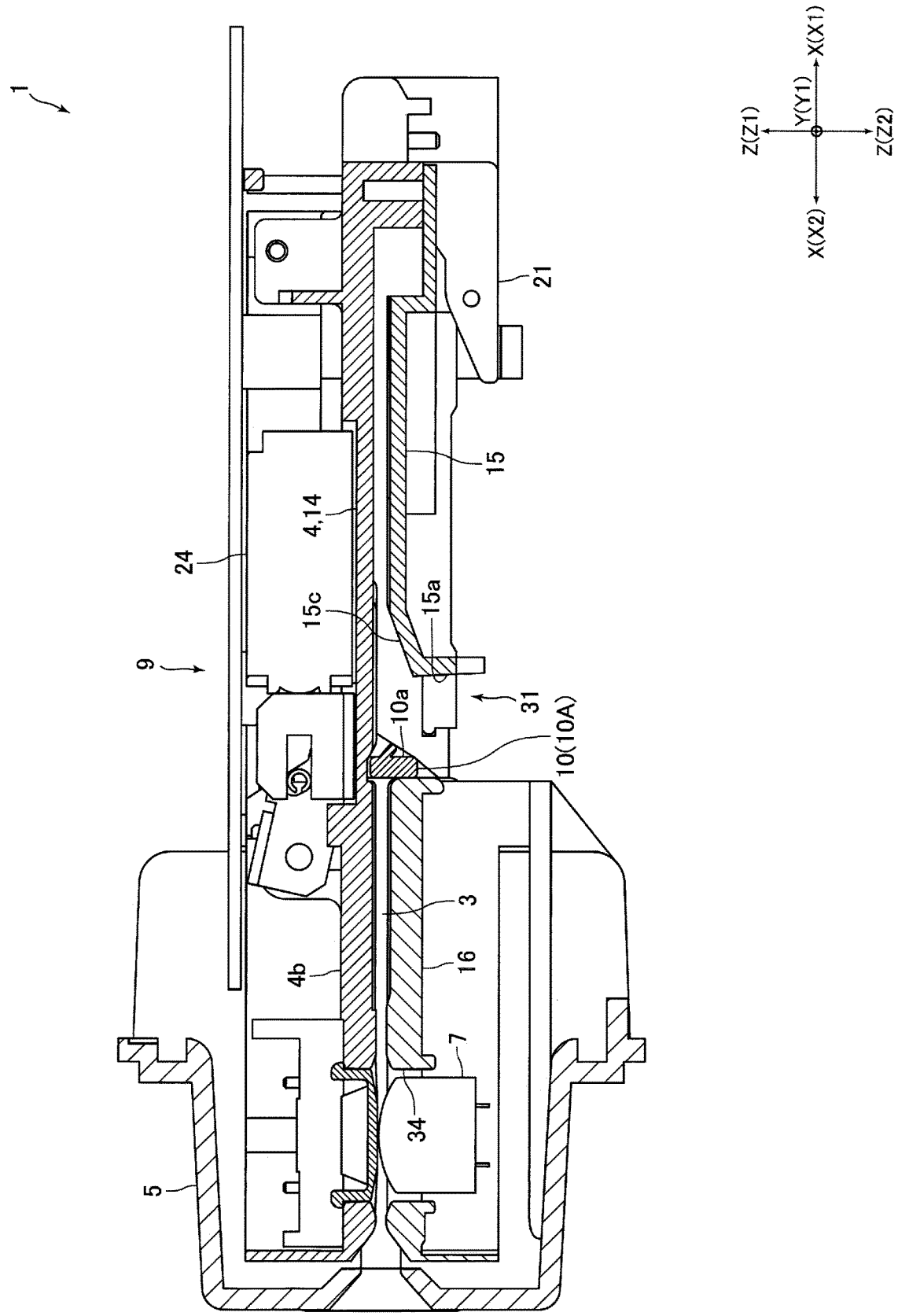
FIG. 5 is a cross sectional view taken along a line 'E-E' in FIG. 2.
Figure 6:
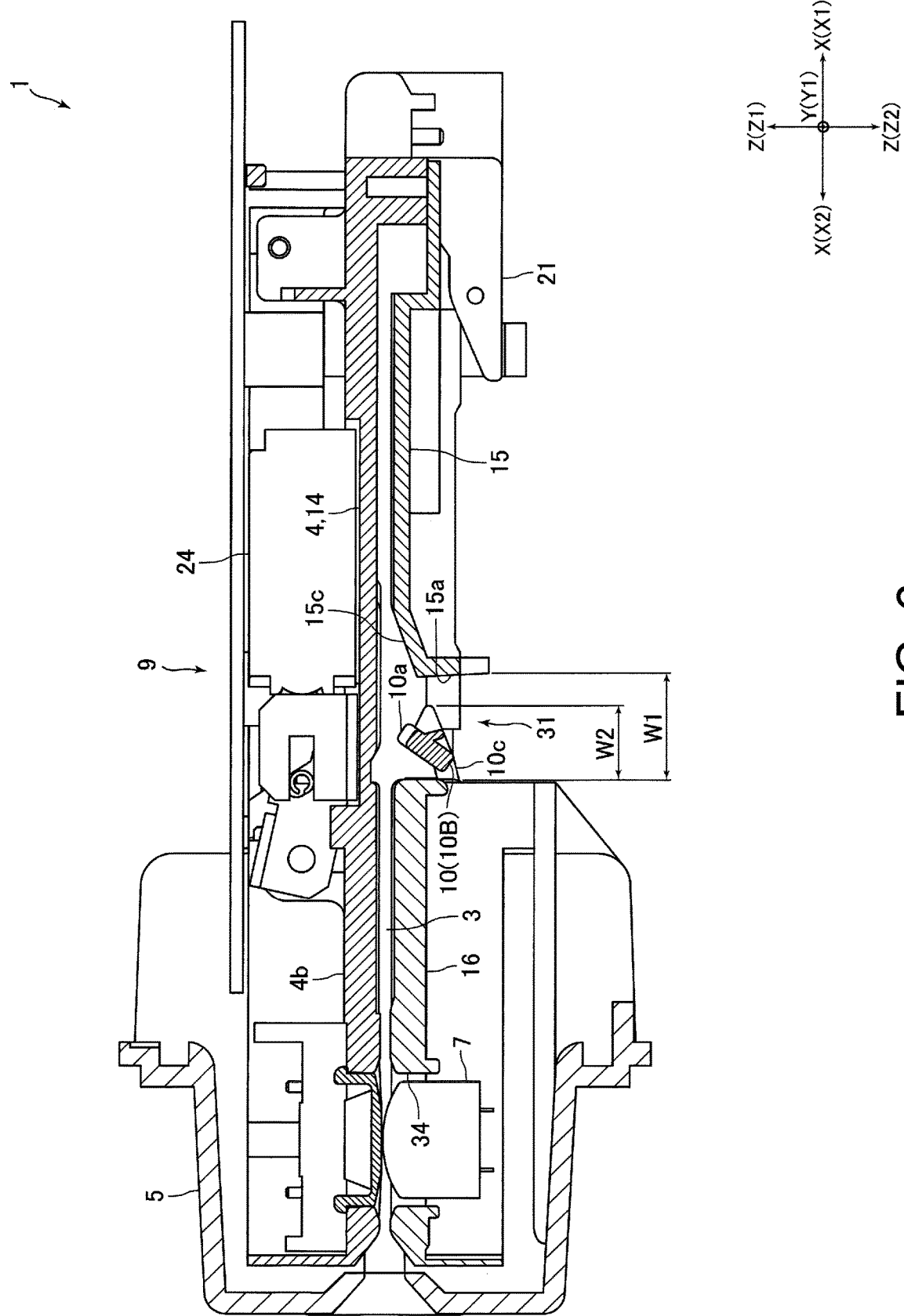
FIG. 6 is a cross sectional view showing a state in which a shutter member shown in FIG. 5 has moved to an open position.

FIG. 1 is a perspective view of a card reader 1 according to an embodiment of the present invention. FIG. 2 is a bottom plan view of the card reader 1 shown in FIG. 1. FIG. 3 is a perspective view showing a state in which a second frame 15 is removed from the card reader 1 shown in FIG. 1. FIG. 4 is a plan view showing a state in which a bezel 5 and the like are removed from the card reader 1 shown in FIG. 1. FIG. 5 is a cross sectional view taken along a line 'E-E' in FIG. 2. FIG. 6 is a cross sectional view showing a state in which a shutter member 10 shown in FIG. 5 has moved to an open position 10B.

The card reader 1 according to the present embodiment is a device with which a user carries out at least one of reading data recorded in a card 2 and recording data into the card 2 by way of manually handling the card 2; and the card reader 1 is a card reader of a so-called dip type. The card reader 1 is installed in a predetermined higher-level device (not illustrated) to be used there. Inside the card reader 1, there is formed a card transfer path 3 through which the card 2 moves. The card reader 1 is provided with a main body frame 4 with which the card transfer path 3 is formed; and a bezel 5 (front side frame) in which a card insertion slot leading to the card transfer path 3 is shaped, the bezel to be fixed to the main body frame 4.

Moreover, the card reader 1 is provided with an IC contact block 6 (refer to FIG. 4) including a plurality of IC contact springs, a magnetic head 7, a lever member 8 (refer to FIG. 4) that prevents a card 2, inserted into the card reader 1, from being extracted, and a driving mechanism 9 for rotating the lever member 8. Furthermore, the card reader 1 is provided with a shutter member 10 that can rotate between a block position 10A (refer to FIG. 5) for blocking the card transfer path 3, and the open position 10B (refer to FIG. 6) for opening the card transfer path 3.

In the present embodiment, the card 2 linearly moves in the card transfer path 3, in an X-direction shown in FIG. 1 and others. In other words, the X-direction is a moving direction of the card 2 that moves through the card transfer path 3. Meanwhile, a Z-direction shown in FIG. 1 and others, being perpendicular to the X-direction, is a thickness direction of the card 2 moving through the card transfer path 3; and a Y-direction shown in FIG. 1 and others, being perpendicular to the X-direction and the Z-direction, is a direction of a width of the card 2 that moves through the card transfer path 3. In the present embodiment, the card reader 1 is placed, for example, in such a way that a perpendicular direction (vertical direction) becomes consistent with the thickness direction of the card 2.

In the following explanation; the X-direction is represented as a front-back direction, the Y-direction is a right-and-left direction, and then the Z-direction is represented as a vertical direction. Moreover, a side of an X1-direction, which is one side in the front-back direction, is represented as a "rear (deep)" side, and a side of an X2-direction as its opposite side is a "front" side; and meanwhile, a side of a Y1-direction, which is one side in the right-and-left direction, is represented as a "right" side, and a side of an Y2-direction as its opposite side is a "left" side; and then, a side of a Z1-direction, which is one side in the vertical direction, is represented as an "upper" side, and a side of an Z2-direction as its opposite side is a "lower" side. In the present embodiment, the card insertion slot is shaped at a front end of the card reader 1, and the card 2 is inserted into the card reader 1 toward a rear side. Then, the card 2 is extracted from the card reader 1 toward a front side.

The card 2 is a card made of polyvinyl chloride, which is shaped to be almost rectangular, having a thickness of about 0.7 to 0.8 mm. On a back side surface of the card 2, there is formed a magnetic stripe in which magnetic data is recorded. Moreover, an IC chip is embedded in the card 2; and meanwhile, on a top side surface of the card 2, there is formed an external connection terminal of the IC chip. The card 2 is inserted into the card insertion slot, in a state where the top side surface of the card 2 faces an upper side and a longitudinal direction of the card 2 is consistent with a front-back direction.

The main body frame 4 is shaped like a flattened cuboid being nearly rectangular and thin in a vertical direction, as a whole. As shown in FIG. 4, a part of a front end side of the main body frame 4 is prepared as a cutout part 4a that is cut out from a front end of the card reader 1 toward a deep side. The cutout part 4a is shaped at a middle position in a right-and-left direction, at a front end side of the main body frame 4; and at both sides of the cutout part 4a in the right-and-left direction, there are shaped protrusion parts 4b and 4c. A front end and a left end of the protrusion part 4b, placed at a right-hand side, are shaped to be open in such a way that the card 2 can be inserted into the card reader 1. Meanwhile, a front end and a right end of the protrusion part 4c, placed at a left-hand side, are shaped to be open in such a way that the card 2 can be inserted into the card reader 1.

Incidentally, the main body frame 4 includes a first frame 14 that makes up an upper side surface of the card transfer path 3 (a surface of the other side of the card transfer path 3, in the thickness direction of the card 2) and both side surfaces of the card transfer path 3 in the right-and-left direction (both side surfaces of the card transfer path 3, in the widthwise direction of the card 2); a second frame 15 that makes up a deep side part of a lower side surface (a surface of one side of the card transfer path 3, in the thickness direction of the card 2) of the card transfer path 3; and a third frame 16 that makes up a front side part of the lower side surface of the card transfer path 3. In the present embodiment, the first frame 14 makes up a rear side surface of the card transfer path 3 (refer to FIG. 5 and FIG. 6).

The protrusion parts 4b and 4c are configured by use of a front side part of the first frame 14 and a front side part of the third frame 16. The shutter member 10 is so supported as to be rotatable by the third frame 16. The first frame 14 according to the present embodiment is a second guiding part, and the second frame 15 is a guiding part, and meanwhile the third frame 16 is a shutter member holding part. A specific configuration of the main body frame 4 is described later.

The bezel 5 is fixed to a front end side part of the main body frame 4, in such a way as to cover the front end side part of the main body frame 4. In the bezel 5, there is shaped a cutout part 5a corresponding to a shape of the cutout part 4a of the main body frame 4. The cutout part 5a is shaped so as to enable a user to insert the card 2 and extract the card 2; and incidentally, at a time when a front end (deep side end) of the card 2 inserted through the card insertion slot reaches a rear end side of the card transfer path 3, an end of the card 2; positioned at the front side of the card reader 1; is located in the cutout part 5a. In the meantime, a rear surface of the bezel 5 is made to be open, and the bezel 5 is fixed to the front end side part, from a front side.

The magnetic head 7 is fixed to the protrusion part 4b. Moreover, the magnetic head 7 is fixed to the third frame 16. The magnetic head 7 is placed in such a way that a magnetic gap of the magnetic head 7 faces the card transfer path 3 from a lower side. The magnetic head 7 is fixed to a leaf spring, which is not illustrated, so as to be biased upward by a biasing force of the leaf spring. If the card 2 is inserted into the card reader 1, the magnetic head 7 touches the back side surface of the card 2 so as to move downward for a distance of a thickness of the card 2. Meanwhile, if the card 2 is extracted, the magnetic head 7 moves upward for the distance of a thickness of the card 2.

The IC contact block 6 is placed at a deep side part in the card reader 1. The IC contact block 6 is placed at an upper side of the card transfer path 3, in such a way that the IC contact springs face the card transfer path 3 from the upper side. Moreover, the IC contact block 6 is connected to the first frame 14 by the intermediary of a parallel link mechanism 18 (refer to FIG. 4), so as to move vertically while sliding in a front-back direction. The IC contact block 6 is biased toward a front side by a tension coil spring 19 (refer to FIG. 4).

According to the present embodiment; in association with operation for inserting the card 2 into a deep side of the card reader 1, the IC contact block 6 moves downward while sliding to the deep side so that the plurality of IC contact springs contact the external connection terminal of the card 2. Then, if the card 2 once inserted into the deep side is extracted to a front side, the IC contact block 6 moves upward while sliding to the front side, by a biasing force of the tension coil spring 19, in such a way that the IC contact springs depart from the top side surface of the card 2.

At a lower side of the IC contact block 6, there is placed a supporting member 21 for making the external connection terminal of the card 2 and the IC contact springs contact each other with a predetermined contact pressure. The supporting member 21 is placed in such a way as to face the card transfer path 3 from a lower side. The supporting member 21 is supported by a rear end part of the first frame 14, in such a way as to enable a rotation with respect to a rotating axis in a right-and-left direction. Incidentally, the supporting member 21 is able to rotate, by using a rear end part of the supporting member 21 as a rotation center, in relation to the first frame 14. To the rear end part of the supporting member 21, there is fixed one end of a tension coil spring that biases the rear end part of the supporting member 21 toward an upper side. The one end of the tension coil spring is engaged with the supporting member 21, at a position of a side more backward than the rotation center of the supporting member 21.

According to the present embodiment; in association with operation for inserting the card 2 into a deep side of the card reader 1, a front end side of the supporting member 21 moves upward, being against a biasing force of the tension coil spring; and the supporting member 21 touches the back side surface (undersurface) of the card 2 so as to support the card 2 from a lower side, in such a way that the external connection terminal of the card 2 and the IC contact springs contact each other with the predetermined contact pressure. Then, if the card 2 once inserted into the deep side is extracted to the front side, the front end side of the supporting member 21 moves downward by the biasing force of the tension coil spring, so as to evacuate from the card transfer path 3.

As described later, the shutter member 10 is placed at a position of a side more frontward than the IC contact block 6 and the supporting member 21. In other words, the IC contact block 6 and the supporting member 21 are placed at positions of a side deeper than the shutter member 10. The IC contact block 6 and the supporting member 21 in the present embodiment are movable components that are placed at the positions of the side deeper than the shutter member 10, and placed so as to face the card transfer path 3, in order to carry out predetermined operation.

The lever member 8 is supported by the first frame 14 so as to be rotatable with respect to a rotating axis in a right-and-left direction. The driving mechanism 9 is provided with a solenoid 24, and a drive power transmission mechanism for transmitting a drive power from the solenoid 24 to the lever member 8. A front end part of the lever member 8 is positioned at a front end side of the protrusion part 4b. The lever member 8 is rotatable between; an extraction-blocked position where the front end part of the lever member 8 is placed inside the card transfer path 3 in order to block an extraction of the card 2 having been inserted; and an evacuation position where the front end part of the lever member 8 evacuates to an upper side from the card transfer path 3 so as to enable an extraction of the card 2. Incidentally, the lever member 8 is biased toward the extraction-blocked position by a spring component such as a twisted coil spring and the like, and meanwhile the lever member 8 rotates from the extraction-blocked position to the evacuation position by use of a power of the solenoid 24.

The shutter member 10 is rotatable with respect to a rotating axis in a right-and-left direction. As described above, the shutter member 10 is held by the third frame 16 so as to be rotatable. Specifically to describe, the shutter member 10 is held so as to be rotatable at a rear end part of the third frame 16. The shutter member 10 is placed at a side deeper than the magnetic head 7, and placed at a position of a side more frontward than the IC contact block 6 and the supporting member 21. Moreover, the shutter member 10 is placed at a side deeper than the cutout part 4a.

The shutter member 10 is provided with a shutter main part 10a for blocking the card transfer path 3, and two holding parts 10b that are held by the third frame 16. The shutter main part 10a is shaped to have an elongated form, being elongated in a right-and-left direction. A width of the shutter main part 10a in a right-and-left direction is slightly narrower than a width of the card transfer path 3 in the right-and-left direction. The two holding parts 10b are individually connected to both ends of the shutter main part 10a in the right-and-left direction. In a state where the shutter member 10 is located at the block position 10A, the holding parts 10b are extended downward from the shutter main part 10a; and meanwhile, a lower end part of the holding parts 10b is held at a rear end part of the third frame 16 so as to be rotatable.

In the present embodiment; if the shutter member 10, being located at the block position 10A, rotates toward a deep side, the shutter member 10 moves to the open position 10B. Specifically to describe; if the shutter member 10, being located at the block position 10A, rotates with respect to a lower end part of the shutter member 10 as a rotation center in such a way that an upper end part of the shutter member 10 moves to a deep side, the shutter member 10 moves to the open position 10B.

Moreover, in the present embodiment; the shutter member 10 is biased toward the block position 10A by a twisted coil spring; and then, in association with an insertion operation of the card 2 after the front end (deep side end) of the card 2, being inserted toward a deep side of the card reader 1, touches a front surface of the shutter main part 10a, the shutter member 10 placed at the block position 10A moves to the open position 10B. In the meantime, if the card 2 once inserted into the deep side is extracted to a front side, the shutter member 10 placed at the open position 10B moves to the block position 10A.

Moreover, the card reader 1 is provided with a rotation restricting member 25 that restricts a rotation of the shutter member 10 being located at the block position 10A. The rotation restricting member 25 is rotatable with respect to a rotating axis in a vertical direction. At a time when the card 2 is not inserted in the card reader 1, the rotation restricting member 25 restricts a rotation of the shutter member 10 by way of engagement with an end of the shutter member 10 in a right-and-left direction, being located at the block position 10A. If the card 2 having a regular width as its widthwise dimension is inserted into the card reader 1, the rotation restricting member 25 rotates so as to cancel a state of an engagement between the rotation restricting member 25 and the shutter main part 10a, in such a way as to lift restriction on the shutter member 10. Incidentally, the rotation restricting member 25 is biased toward a position for the engagement with the shutter member 10, by a predetermined spring component.

(General Configuration of the Main Body Frame)

As described above, the main body frame 4 is made up with the first frame 14, the second frame 15, and the third frame 16. The first frame 14, the second frame 15, and the third frame 16 are individually formed as a separate component. Moreover, the first frame 14, the second frame 15, and the third frame 16 are formed of resin. The second frame 15 is fixed to the first frame 14. Specifically to describe, the second frame 15 is fixed to a deep side part of the first frame 14, by use of a screw 30. The screw 30 is placed at a rear end part of the second frame 15, in such a way as to be placed at both end parts at right and left sides of the second frame 15.

In the first frame 14, there is shaped an engagement groove 14a with which a front end part of the second frame 15 engages. The engagement groove 14a is shaped at both end sides at right and left sides of the first frame 14. The engagement groove 14a restricts a relative movement of the second frame 15 in relation to the first frame 14 in a vertical direction, a right-and-left direction, and a frontward direction. Incidentally, the third frame 16 is also fixed to a front side part of the first frame 14, by use of a screw. Meanwhile, the second frame 15 may be made of metal.

As described above, the shutter member 10 is held so as to be rotatable, at the rear end part of the third frame 16. The second frame 15 is placed at a side deeper than the shutter member 10. Between the third frame 16 and the second frame 15, there is formed an open part 31 in order to prevent an interference of the shutter member 10, rotating toward the open position 10B, with the main body frame 4 (specifically to describe, an interference of the shutter member 10 with the second frame 15), and in order to eject a foreign object out of the card transfer path 3.

In other words, the open part 31 is formed in a part within a lower side surface of the card transfer path 3, at a side deeper than the shutter member 10. Specifically to describe, in a front-back direction, there is formed a clearance between a rear end surface of the third frame 16 and a front end surface of the second frame 15, and the clearance is the open part 31. The open part 31 leads from a bottom surface of the main body frame 4 to the card transfer path 3. The open part 31 in the present embodiment is a first open part.

The rear end surface of the third frame 16 is a plane perpendicular to a front-back direction. The front end surface of the second frame 15 is configured with a first front end surface 15a that is flat, and nearly perpendicular to the front-back direction, and two second front end surfaces 15b, being flat and leading to both ends at right and left sides of the first front end surface 15a. Each of the second front end surfaces 15b is a slope surface which is sloped in such a way that; the outer in a right-and-left direction a position is located, the more frontward the position is located. At a front end part of the second frame 15, there is shaped a slope surface 15c which is sloped in such a way that; the more frontward a position is located, the further downward the position is located. In other words, at the front end part of the second frame 15, there is shaped the slope surface 15c which is sloped in such a way that; the more frontward a position is located, the further the position is departed from the card transfer path 3. Specifically to describe, the slope surface 15c is shaped on a top surface at the front end part of the second frame 15. A front end of the slope surface 15c leads to an upper end of the first front end surface 15a.

A width of the open part 31 in a right-and-left direction is wider than a width of the shutter main part 10a in the right-and-left direction. Meanwhile, a width of the first front end surface 15a in the right-and-left direction is almost equal to the width of the shutter main part 10a in the right-and-left direction. As shown in FIG. 6, provided that a part of the shutter member 10 located at the open position 10B; the part being placed inside the open part 31; is represented as an open-part placement portion 10c, a maximum width W1 of the open part 31 in a front-back direction is 1.3 through 2 times as large as a width W2 of the open-part placement portion 10c in the front-back direction. In other words; the maximum width W1, which is a distance between the rear end surface of the third frame 16 and the first front end surface 15a in the front-back direction, is 1.3 through 2 times as large as the width W2. In the present embodiment, the maximum width W1 is approximately 1.5 times as large as the width W2.

In the first frame 14, there is formed an open part 32 in order to prevent an interference of the IC contact block 6 with the main body frame 4 (specifically to describe, the interference of the IC contact block 6 with the first frame 14). In other words; in a part within an upper side surface of the card transfer path 3, at a side deeper than the shutter member 10, there is formed the open part 32. The open part 32 penetrates through the first frame 14 in a vertical direction, so as to lead from a top surface of the main body frame 4 to the card transfer path 3. Size of the open part 32 is made to be a minimum required for causing no interference of the IC contact block 6, moving vertically while sliding in a front-back direction, with the first frame 14. The open part 32 in the present embodiment is a second open part.

In the second frame 15, there is formed an open part 33 in order to prevent an interference of the supporting member 21 with the main body frame 4 (specifically to describe, the interference of the supporting member 21 with the second frame 15). In other words; in a part within a lower side surface of the card transfer path 3, at a side deeper than the shutter member 10, there is formed the open part 33. The open part 33 penetrates through the second frame 15 in a vertical direction, so as to lead from a bottom surface of the main body frame 4 to the card transfer path 3. Size of the open part 33 is made to be a minimum required for causing no interference of the supporting member 21, rotating with respect to a rear end part as a rotation center, with the second frame 15. The open part 33 in the present embodiment is a second open part.

In the present embodiment; in the parts within both the upper side surface and the lower side surface of the card transfer path 3, at a side deeper than the shutter member 10, there are formed only the open part 31 through the open part 33. In other words; no other open part except the open part 31 through the open part 33 is formed in the parts within both the upper side surface and the lower side surface of the card transfer path 3, at a side deeper than the shutter member 10, so that all portion except the open part 31 through the open part 33 is blocked (filled up) in the parts within both the upper side surface and the lower side surface of the card transfer path 3, at a side deeper than the shutter member 10. Incidentally, at a front end part of the third frame 16, there is formed an open part 34 where a top end part of the magnetic head 7 is placed. The open part 34 penetrates the third frame 16 in a vertical direction. Furthermore, at a front end part of the first frame 14, there is formed an open part where the front end part of the lever member 8 is placed. This open part penetrates the first frame 14 in the vertical direction.

In a part within a side surface of the first frame 14 in a right-and-left direction, at a side deeper than the shutter member 10, there is shaped an open part 35 for ejecting a foreign object out of the card transfer path 3. Namely, in the part within the side surface of the card transfer path 3 in the right-and-left direction, at the side deeper than the shutter member 10, there is shaped the open part 35. The open part 35 is shaped, for example, in a left side surface of the first frame 14. The open part 35 penetrates the first frame 14 in the right-and-left direction so as to lead from the left side surface of the main body frame 4 to the card transfer path 3. Meanwhile, the open part 35 is shaped like a rectangular bore, being elongated so as to be rectangular in a front-back direction. The open part 35 in the present embodiment is a third open part.

Primary Advantageous Effect of the Present Embodiment

As explained above, in the present embodiment; the open part 31 is formed in the part within the lower side surface of the card transfer path 3, at the side deeper than the shutter member 10; in order to prevent an interference of the shutter member 10, rotating toward the open position 10B, with the second frame 15; and in order to eject a foreign object out of the card transfer path 3. Therefore, according to the present embodiment, it becomes possible to eject a foreign object, such as a particle dust and the like, out of the card transfer path 3, by making use of the open part 31.

In the present embodiment; in the parts within both the upper side surface and the lower side surface of the card transfer path 3, at the side deeper than the shutter member 10, there are formed only the open part 31 through the open part 33, and no open part except the open part 31 through the open part 33 is formed there. Therefore, according to the present embodiment, it easily becomes possible to prevent a skimming device from being installed inside the card reader 1. Incidentally, a width in the vertical direction of the open part 35, shaped in the left side surface of the card transfer path 3, is so narrow that it is difficult to install a skimming device inside the card reader 1 by making use of the open part 35, even though the open part 35 is shaped in the left side surface of the card transfer path 3.

In the present embodiment; the open part 31, for ejecting a foreign object out of the card transfer path 3, also plays a role in prevention of an interference of the shutter member 10, rotating toward the open position 10B, with the second frame 15. Therefore, according to the present embodiment; in a case where a skimming device is installed in the open part 31, the shutter member 10, rotating toward the open position 10B, interferes with the skimming device so that the shutter member 10 does not rotate to the open position 10B. Therefore, according to the present embodiment; in case of a skimming device having been installed in the open part 31, if the card 2 is inserted into the card reader 1, the shutter member 10 does not rotate from the block position 10A to the open position 10B so that it becomes impossible to accept the card 2 into the card reader 1. As a result of that, in the present embodiment, even in a case where a skimming device is installed inside the card reader 1, it still becomes possible to protect data from illegally reading by use of the skimming device.

In the present embodiment; the maximum width W1 of the open part 31 in the front-back direction is 1.3 through 2 times as large as the width W2 of the open-part placement portion 10c in the front-back direction. Therefore, according to an examination by the inventor of the present invention, it easily becomes possible to effectively prevent an installation of a skimming device to the open part 31, and it easily becomes possible to eject a foreign object, such as a particle dust and the like, out of the card transfer path 3, by making use of the open part 31. Moreover, in the present embodiment; since the open part 31 is formed immediately next to the shutter member 10 at a deep side, a particle dust having entered through the card insertion slot can be ejected out of the card transfer path 3, at the deep side immediately next to the shutter member 10.

In the present embodiment; at the front end part of the second frame 15, there is shaped the slope surface 15c which is sloped in such a way that; the more frontward a position is located, the further downward the position is located. Therefore, according to the present embodiment, it becomes possible to prevent the front end (deep side end) of the card 2, moving toward a deep side of the open part 31, from being caught at the front end part of the second frame 15. Moreover, according to the present embodiment, the second frame 15 is formed as a separate component being independent from the first frame 14, and then fixed to the first frame 14; and therefore, for example, in the case of the card reader 1, in which the second frame 15 is not mounted, being already installed in a market, it becomes possible to additionally mount the second frame 15 in the card reader 1.

Other Embodiments

Described above is an example of a preferred embodiment according to the present invention; and the present invention is not limited to the above embodiment and various variations and modifications may be made without changing the concept of the present invention.

In the embodiment described above, the card reader 1 may be provided with a capacitance sensor 40 to be placed at a side deeper than the shutter member 10 (refer to a component shown with a two-dot chain line in FIG. 2). In such a case, the capacitance sensor 40 is fixed to the second frame 15 made of resin. The capacitance sensor 40 is fixed, for example, to a bottom surface of the second frame 15. In this case, if a skimming device is installed inside the card reader 1, it becomes possible by use of the capacitance sensor 40 to detect the skimming device having been installed.

In the embodiment described above, the card reader 1 may not be provided with the IC contact block 6 and the supporting member 21. In that case, the open part 32 and the open part 33 are not formed in the main body frame 4. Namely, in that case, only the open part 31 is formed in the part within both the upper side surface and the lower side surface of the card transfer path 3, at the side deeper than the shutter member 10, and no open part other than the open part 31 is formed. Even in this case, the same effect can be obtained as it is in the embodiment described above.

In the embodiment described above, the magnetic head 7 may be placed at a side deeper than the shutter member 10. In this case, there is formed an open part in the second frame 15, in order to prevent an interference of the magnetic head 7 with the second frame 15. In other words, in a part within the lower side surface of the card transfer path 3, at a side deeper than the shutter member 10; there is formed the open part, in order to prevent an interference of the magnetic head 7 with the main body frame 4. The magnetic head 7 in this case is a movable component, and the open part formed in the second frame 15 is a second open part.

Though the card reader 1 in the embodiment described above is a manual card reader, the card reader to which the present embodiment is applied may be a card reader of a card-transfer type, which includes a transfer mechanism for the card 2. For example, in this case, a driving roller and a pad roller for transferring the card 2 are placed at a side deeper than the shutter member 10, and placed so as to face the card transfer path 3. Meanwhile, the driving roller and the pad roller rotate at a time of transferring the card 2.

Furthermore, in this case; in a part within either one of the upper side surface and the lower side surface of the card transfer path 3, at a side deeper than the shutter member 10; there is formed an open part in order to prevent an interference of the driving roller with the main body frame 4; and meanwhile, in a part within the other one of the upper side surface and the lower side surface of the card transfer path 3, at a side deeper than the shutter member 10; there is formed an open part in order to prevent an interference of the pad roller with the main body frame 4. The driving roller and the pad roller in this case are movable components, and the open parts formed in the upper side surface and the lower side surface of the card transfer path 3 are second open parts.

In the embodiment described above, the maximum width W1 of the open part 31 in the front-back direction may be less than 1.3 times or more than two times the size of the width W2 of the open-part placement portion 10c in the front-back direction. Moreover, in the embodiment described above, the first frame 14 and the second frame 15 may be shaped as a single component. For example, the first frame 14 and the second frame 15 may integrally be formed. Furthermore, the first frame 14 and the third frame 16 may be shaped as a single component, and still further the second frame 15 and the third frame 16 may be shaped as a single component.

In the embodiment described above, the card reader 1 may be installed in such a way that a left side surface of the card reader 1 faces downward. In such a case, it becomes possible to eject a foreign object, such as a particle dust and the like, out of the card transfer path 3, by making use of the open part 35. Furthermore, in the embodiment described above, the card 2 may be a polyethylene terephthalate (PET) card having a thickness of about 0.18 to 0.36 mm, or a paper card and the like having a predetermined thickness.

What is claimed is:

1. A card reader for carrying out at least one of reading data recorded in a card and recording data into the card, the card reader comprising:
    a main body frame in which a card transfer path for moving the card is formed;
    a shutter member that is rotatable between a block position for blocking the card transfer path and an open position for opening the card transfer path; and
    a movable component that is placed at a position of a side deeper than the shutter member in the card reader, and placed so as to face the card transfer path, in order to carry out predetermined operation;
    wherein, the shutter member is rotatable with respect to a rotating axis in a widthwise direction of the card, the widthwise direction being perpendicular to both a moving direction of the card moving through the card transfer path, and a thickness direction of the card moving through the card transfer path;
    if the shutter member, being located at the block position, rotates toward a deep side, the shutter member moves to the open position; and
    in a part within a surface of a side of the card transfer path in the thickness direction of the card, at a side deeper than the shutter member, there are formed only a first open part and a second open part, and no other open part except the first open part and the second open part is formed; wherein the first open part prevents an interference between the main body frame and the shutter member that rotates toward the open position, and the first open part ejects a foreign object out of the card transfer path; the second open part prevents an interference between the movable component and the main body frame,
    wherein a part of the shutter member located at the open position and placed inside the first open part is represented as an open-part placement portion, and
    a maximum width of the first open part in the moving direction of the card is 1.3 through 2 times as large as a width of the open-part placement portion in the moving direction of the card.

2. The card reader according to claim 1;
    wherein, the movable component comprises an IC contact block including a plurality of IC contact springs that contacts an external connection terminal of an IC chip, which is formed on a surface of one side of the card; and a supporting member that contacts a surface of the other side of the card and supports the card, in order to make the external connection terminal and the IC contact springs contact each other with a predetermined contact pressure;
    the second open part, for preventing an interference of the supporting member with the main body frame, is formed in a surface of one side of the card transfer path in the thickness direction of the card; and
    the second open part, for preventing an interference of the IC contact block with the main body frame, is formed in a surface of the other side of the card transfer path in the thickness direction of the card.

3. The card reader according to claim 2;
    wherein, the main body frame comprises a shutter member holding part that holds the shutter member in such a way as to be rotatable; and a first guiding part that constitutes a part of a surface of one side of the card transfer path in the thickness direction of the card and is placed at a side deeper than the shutter member; and
    the first open part is formed between the shutter member holding part and the first guiding part.

4. The card reader according to claim 1;
    wherein, the main body frame comprises a shutter member holding part that holds the shutter member in such a way as to be rotatable; and a first guiding part that constitutes a part of a surface of one side of the card transfer path in the thickness direction of the card and is placed at a side deeper than the shutter member; and
    the first open part is formed between the shutter member holding part and the first guiding part.

5. The card reader according to claim 4;
    wherein, a slope surface is formed at a front end part of the first guiding part, wherein at the front end part of the first guiding part, the slope surface is sloped in such a way that the more frontward a position is located, the further downward the position is located.

6. The card reader according to claim 5;
    wherein, the main body frame comprises a second guiding part that constitutes the surface of the other side of the card transfer path in the thickness direction of the card and both side surfaces of the card transfer path in the widthwise direction of the card; and
    the first guiding part is formed as a component being separate from the second guiding part, and fixed to the second guiding part.

7. The card reader according to claim 6;
    wherein, the card reader is provided with a capacitance sensor to be placed at a side deeper than the shutter member;
    the first guiding part is formed of resin; and
    the capacitance sensor is fixed to the first guiding part.

8. The card reader according to claim 4;
    wherein, the main body frame comprises a second guiding part that constitutes the surface of the other side of the card transfer path in the thickness direction of the card and both side surfaces of the card transfer path in the widthwise direction of the card; and
    the first guiding part is formed as a component being separate from the second guiding part, and fixed to the second guiding part.

9. The card reader according to claim 4;
    wherein, the card reader is provided with a capacitance sensor to be placed at a side deeper than the shutter member;
    the first guiding part is formed of resin; and
    the capacitance sensor is fixed to the first guiding part.

10. The card reader according to claim 1;
    wherein, in a part within a side surface of the card transfer path in the widthwise direction of the card, at a side deeper than the shutter member, a third open part is formed for ejecting the foreign object out of the card transfer path.

11. A card reader for carrying out at least one of reading data recorded in a card and recording data into the card, the card reader comprising:
    a main body frame in which a card transfer path for moving the card is formed; and
    a shutter member that is rotatable between a block position for blocking the card transfer path and an open position for opening the card transfer path;
    wherein, the shutter member is rotatable with respect to a rotating axis in a widthwise direction of the card, the widthwise direction being perpendicular to both a moving direction of the card moving through the card transfer path, and a thickness direction of the card moving through the card transfer path;

if the shutter member, being located at the block position, rotates toward a deep side of the card reader, the shutter member moves to the open position; and in a part within a surface of a side of the card transfer path in the thickness direction of the card, at a side deeper than the shutter member, there is formed only a first open part, and no other open part except the first open part is formed; wherein the first open part prevents an interference between the main body frame and the shutter member that rotates toward the open position, and ejects a foreign object out of the card transfer path, wherein a part of the shutter member located at the open position and placed inside the first open part is represented as an open-part placement portion, and a maximum width of the first open part in the moving direction of the card is 1.3 through 2 times as large as a width of the open-part placement portion in the moving direction of the card.

12. The card reader according to claim 11;

wherein, the main body frame comprises a shutter member holding part that holds the shutter member in such a way as to be rotatable; and a first guiding part that constitutes a part of a surface of one side of the card transfer path in the thickness direction of the card and is placed at a side deeper than the shutter member; and the first open part is formed between the shutter member holding part and the first guiding part.

13. The card reader according to claim 12;

wherein, a slope surface is formed at a front end part of the first guiding part, wherein at the front end part of the first guiding part, the slope surface is sloped in such a way that the more frontward a position is located, the further downward the position is located.

14. The card reader according to claim 13;

wherein, the main body frame comprises a second guiding part that constitutes the surface of the other side of the card transfer path in the thickness direction of the card and both side surfaces of the card transfer path in the widthwise direction of the card; and the first guiding part is formed as a component being separate from the second guiding part, and fixed to the second guiding part.

15. The card reader according to claim 14;

wherein, the card reader is provided with a capacitance sensor to be placed at a side deeper than the shutter member;

the first guiding part is formed of resin; and the capacitance sensor is fixed to the first guiding part.

16. The card reader according to claim 12;

wherein, the main body frame comprises a second guiding part that constitutes the surface of the other side of the card transfer path in the thickness direction of the card and both side surfaces of the card transfer path in the direction of a width of the card; and the first guiding part is formed as a component being separate from the second guiding part, and fixed to the second guiding part.

17. The card reader according to claim 12;

wherein, the card reader is provided with a capacitance sensor to be placed at a side deeper than the shutter member;

the first guiding part is formed of resin; and the capacitance sensor is fixed to the first guiding part.

18. The card reader according to claim 11;

wherein, in a part within a side surface of the card transfer path in the widthwise direction of the card, at a side deeper than the shutter member, a third open part is formed for ejecting the foreign object out of the card transfer path.

* * * * *